(No Model.) 6 Sheets—Sheet 1.

G. MEADER.
CORN HARVESTER.

No. 461,246. Patented Oct. 13, 1891.

Witnesses:
Arthur Johnson.
D J Eastburn

Inventor:
George Meader (No Model.)  
6 Sheets—Sheet 2.

G. MEADER.
CORN HARVESTER.

No. 461,246. Patented Oct. 13, 1891.

Witnesses:  
Arthur Johnson  
D. J. Eastbum

Inventor:  
George Meader (No Model.) 6 Sheets—Sheet 5.

G. MEADER.
CORN HARVESTER.

No. 461,246. Patented Oct. 13, 1891.

Witnesses.
Arthur Johnson.
A. J. Eastburn.

Inventor.
George Meader (No Model.) 6 Sheets—Sheet 6.
G. MEADER.
CORN HARVESTER.
No. 461,246. Patented Oct. 13, 1891.
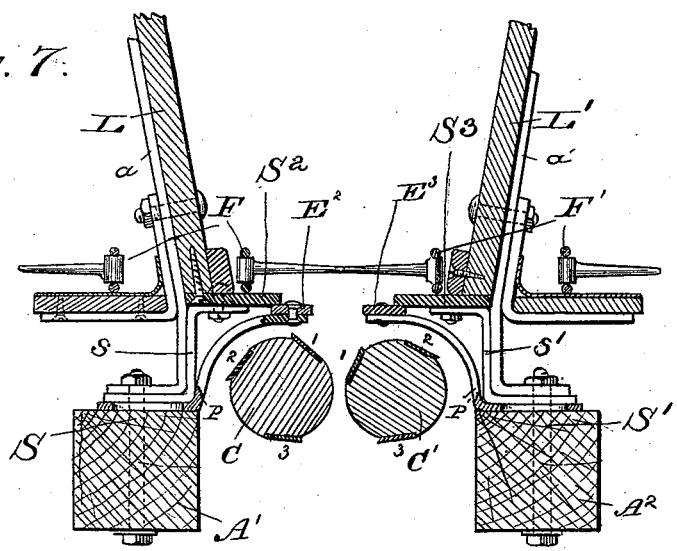
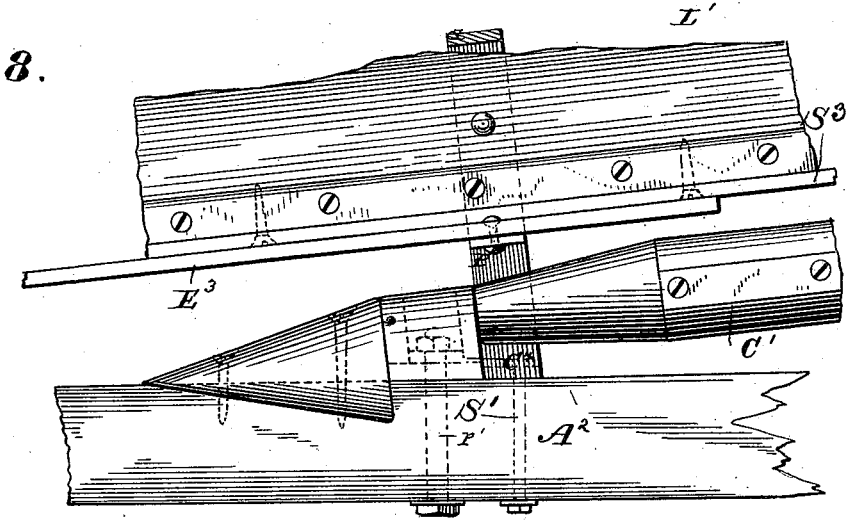
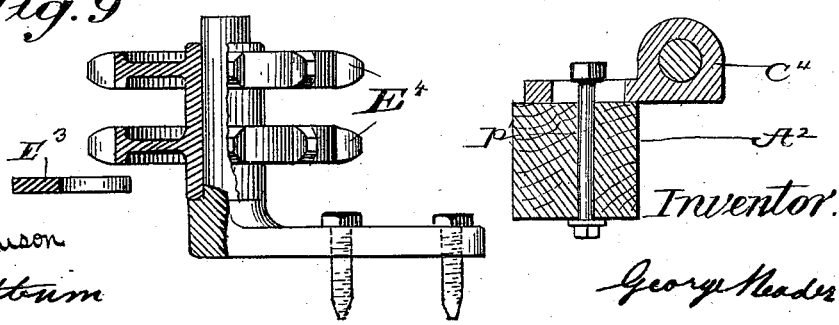
Witnesses.
Arthur Johnson
D. J. Eastburn
Inventor.
George Meader

UNITED STATES PATENT OFFICE.

GEORGE MEADER, OF FOWLER, INDIANA.

CORN-HARVESTER.

SPECIFICATION forming part of Letters Patent No. 461,246, dated October 13, 1891.

Application filed June 10, 1889. Serial No. 313,709. (No model.)

*To all whom it may concern:*

Be it known that I, GEORGE MEADER, of Fowler, in the county of Benton and State of Indiana, have invented certain new and useful Improvements in Corn-Harvesters, of which the following is a full description, reference being had to the accompanying drawings, in which—

Figure 1:
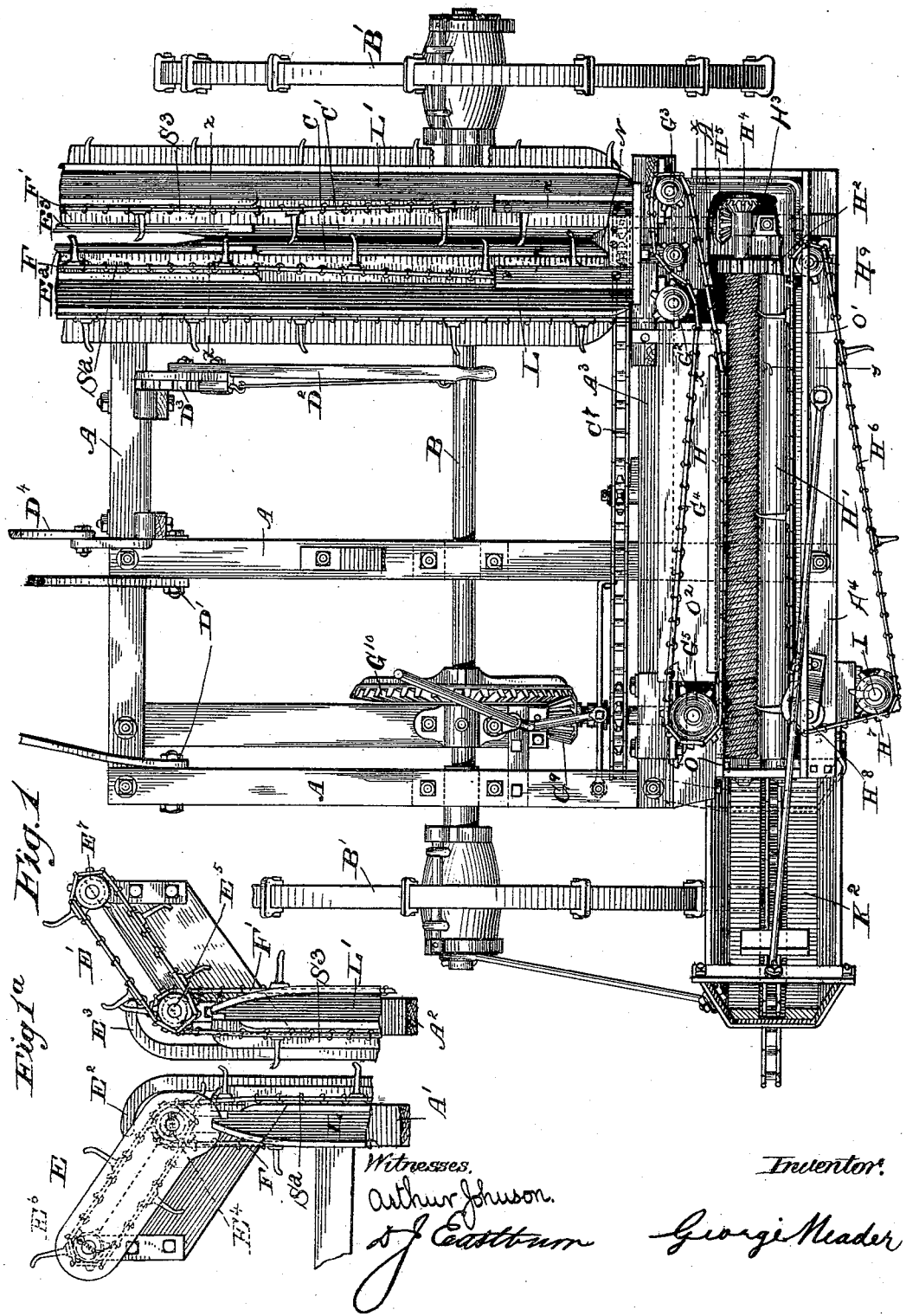
Figure 2:
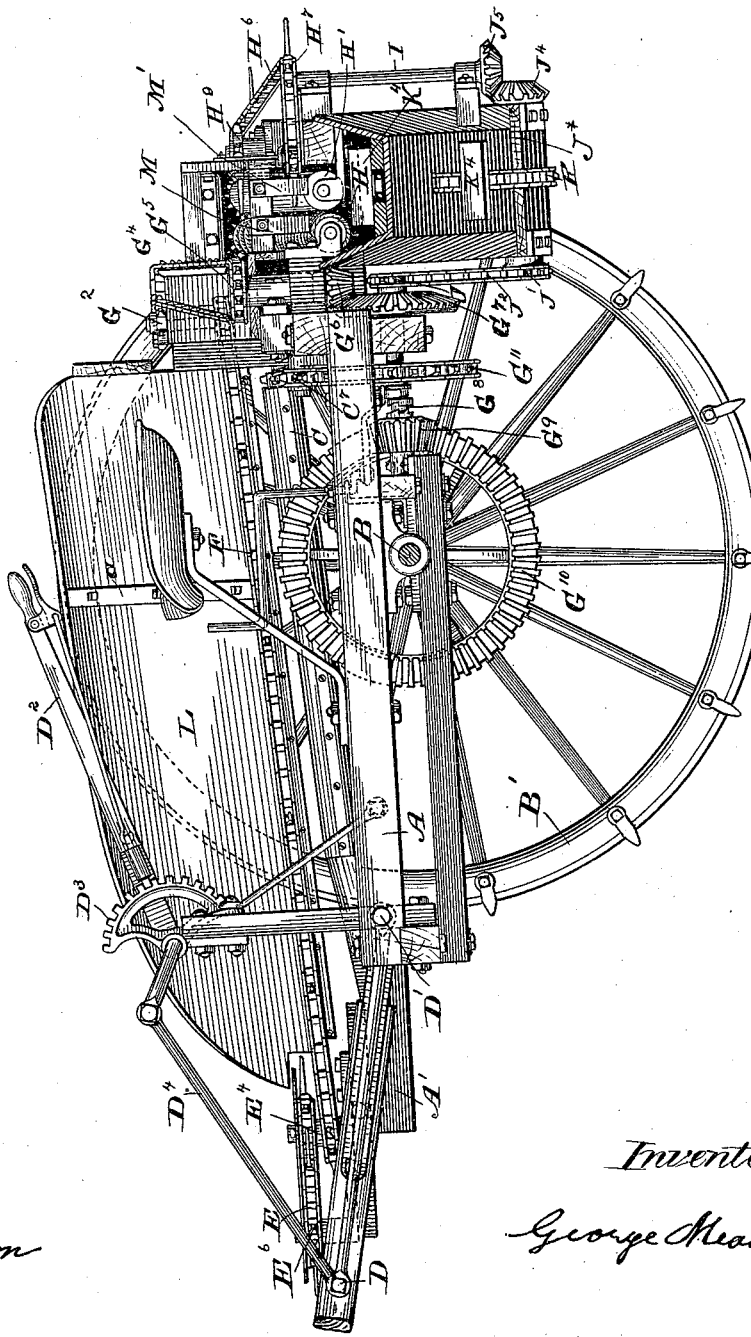
Figure 3:
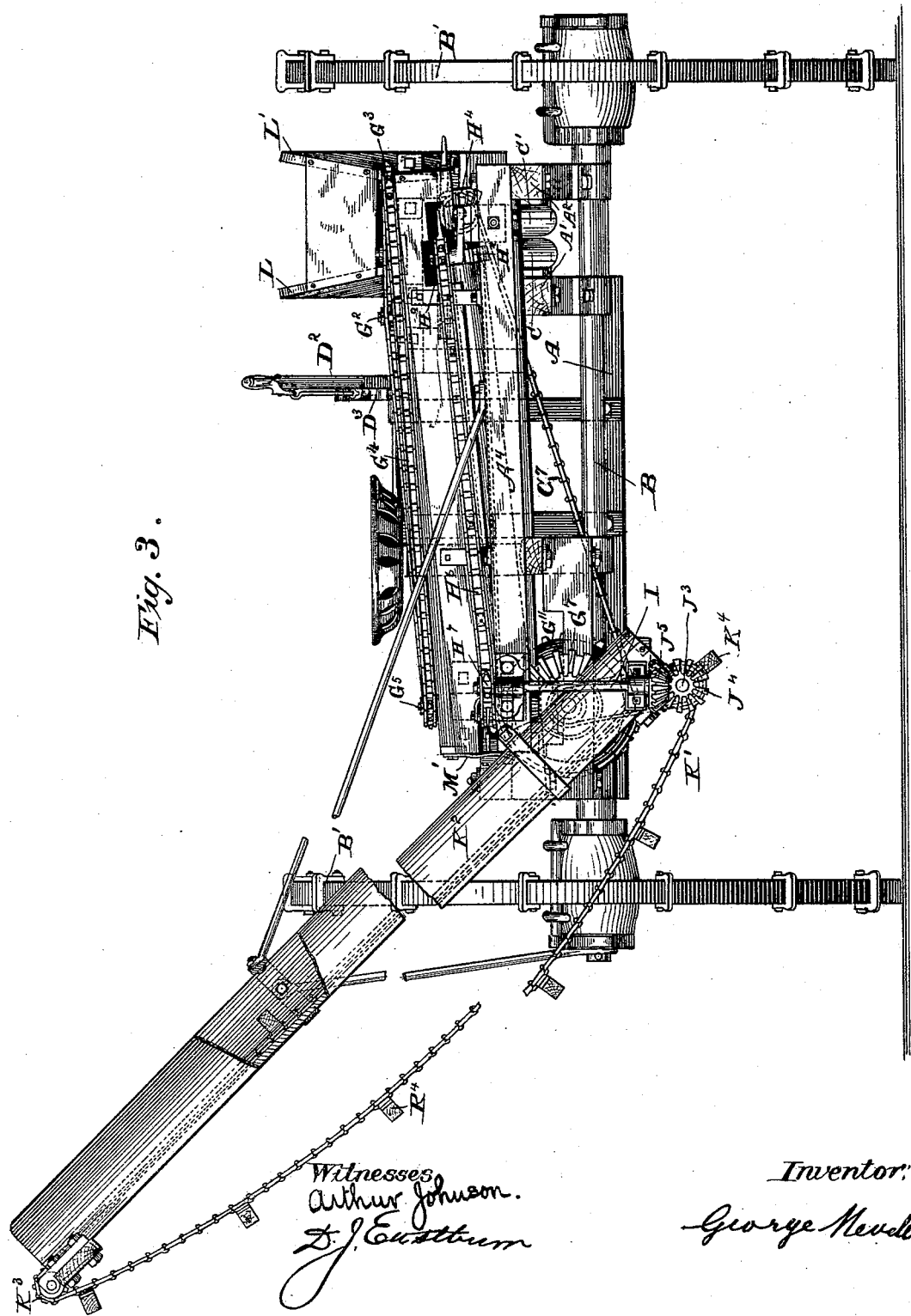
Figure 4:
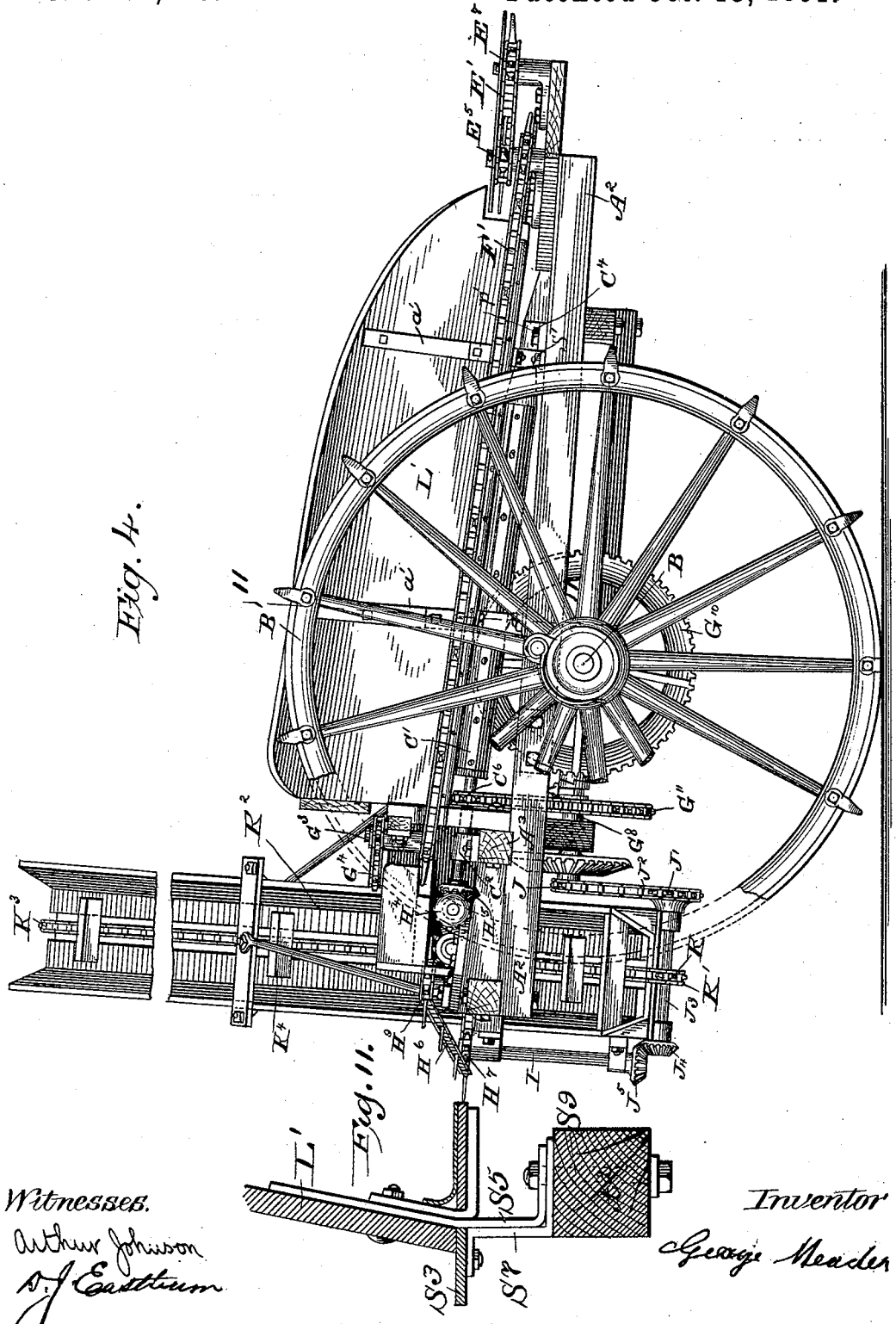
Figure 5:
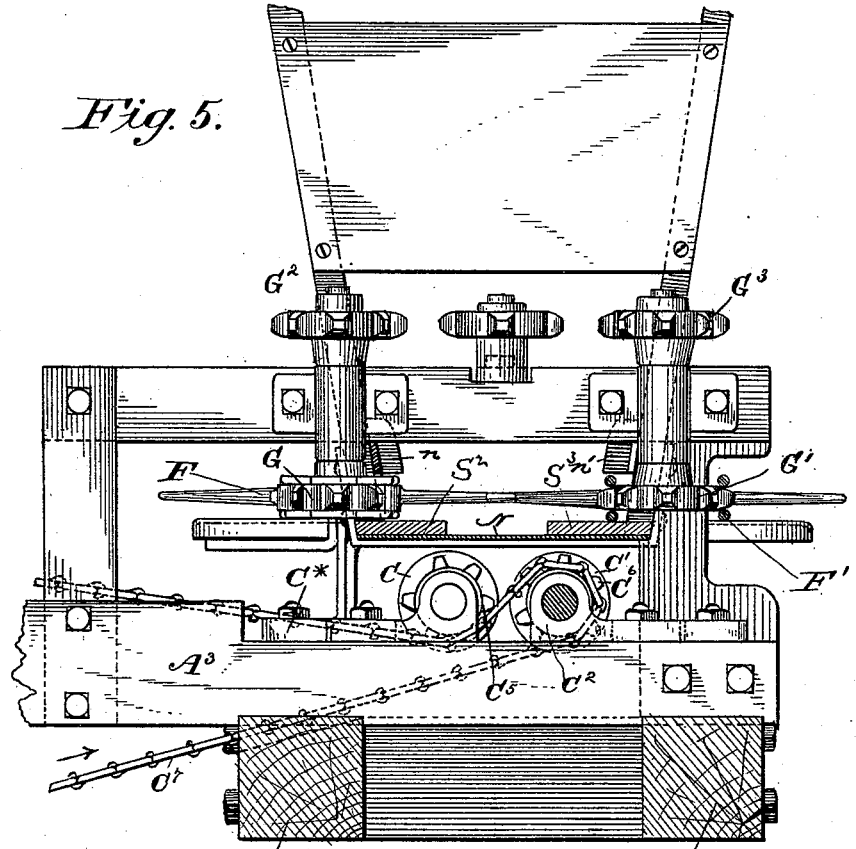
Figure 6:
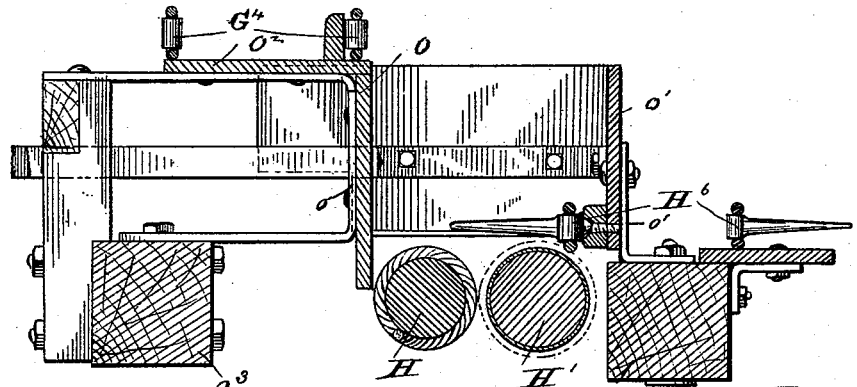

Figure 1 is a plan view. Fig. 1$^a$ shows the gathering devices which are broken away from Fig. 1; Fig. 2, a left-hand side elevation; Fig. 3, a rear elevation; Fig. 4, a right-hand side elevation; Fig. 5, a rear sectional view of certain parts of the machine as if cut on the line X of Fig. 1; Fig. 6, a sectional view of certain parts as if cut on the line Y Y of Fig. 1; Fig. 7, a rear sectional view as if cut on the line Z Z of Fig. 1; Fig. 8, a detail of the forward end of the picking-rollers and adjacent parts; Fig. 9, a detail of the double sprocket-wheel forming part of the gathering device. Fig. 10 is a sectional view of a detail. Fig. 11 is a vertical transverse section through the beam A$^2$ and the parts supported thereby on the line 11 11 of Fig. 4.

The object of my invention is to produce a machine that may be drawn through the field to pick the ears from the stalks and deliver them into a wagon drawn alongside thereof.

The parts lettered A constitute the main frame. B is the axle journaled in suitable bearings in the main frame and having the wheels B$'$ clutched to the axle by means of ratchets and pawls. A$'$ and A$^2$ are portions of the main frame which support the gathering and picking devices.

C and C$'$ are the picking-rollers, journaled in bearings C$^2$ and C$^4$ upon the sill A$^3$ at the rear end, and at the front end journaled in the bearings C$^4$. These bearings are secured to the sills by means of bolts P. These rollers are provided at their rear ends with sprocket-wheels C$^5$ and C$^6$. C$^7$ is a chain adapted to run around the wheel C$^6$ and beneath the wheel C$^5$. The movement of this chain C$^7$ in the direction indicated by the arrow will give the rollers an inward and downward rotation. On each side of the picking-rollers and above the same I arrange inclined upright boards L L$'$, which extend longitudinally of the beams A$'$ A$^2$ and are sustained above the same by standards $a$ $a'$. Each of the standards is bolted at its upper end to the outside of the boards L L$'$, whence it extends downward and is bent outward horizontally at its lower end. The horizontal portions are seated upon the horizontal portions of brackets $s$ $s'$, which are in turn seated upon the horizontal ends of standards P P$'$, hereinafter referred to, which latter are seated upon the beams A$'$ A$^2$ and secured by means of bolts S S$'$, passing through the horizontal ends of the standards and intermediate bracket and the beams. The upper ends of the brackets $s$ $s'$ are bent laterally inward and support plates S$^2$ S$^3$, extending longitudinally of the boards L L$'$ at their inside along the lower edge. These plates are for the purpose of supporting chains F F$'$, hereinafter described. At their rear ends the boards L L$'$ are sustained by standards S$^5$, (similar to the forward standards,) which are seated upon brackets S$^7$, (similar to the forward brackets,) the upper ends of which sustain the rear ends of the plates S$^2$ S$^3$. The standards S$^5$ are seated at their lower ends upon the lower ends of the brackets S$^7$, both of which are secured upon the beams by bolts S$^9$. The boards L L$'$ serve to prevent the escape of the ears while being acted on by the picking-rollers.

D is a draft-tongue pivoted at D$'$. D$^2$ is a tilting-lever having a latch adapted to engage the quadrant D$^3$. D$^4$ is a link connecting the tilting-lever with the draft-tongue. By movement of this lever the whole machine may be tilted, and thus the angle of the rollers relative to the horizon may be changed at will, thus adapting the rollers to engage the stalks at a high or low point, as required. It is desirable at all times to engage the stalks no nearer to the butts than is absolutely necessary to cut off the ears, as by so doing the labor of passing the butt or heavy end of the stalk through the rollers is avoided.

For the purpose of gathering the stalks into the machine I provide the toothed chains E and E$'$, flaring forward and outward from the point where the stalks enter a channel formed by the bars E$^2$ and E$^3$. These bars extend from a point a short distance in rear of the forward ends of the picking-rollers forward and terminate in advance of the chains F F$'$, at which point they flare outward. They are sustained by means of standards P P$'$, before referred to, which have their bases slotted transversely of the beams to which they are secured by vertical bolts S S'. Under this construction the bars may be adjusted nearer together or farther apart, according as the nature and condition of the corn may demand. The chains E E' are thrust around the sprocket-wheels $E^4$ and $E^5$ and around sprocket-wheels $E^6$ and $E^7$. Motion is imparted to these chains by means of other toothed chains F and F'. The sprocket-wheels $E^4$ and $E^5$ are made double, as shown in Fig. 9, and the chains F and F' are upon the lower part of the double wheels. They are also provided with teeth sufficiently long to reach so nearly across the slot formed by the bars $E^2$ and $E^3$ as to convey all stalks rearward that are brought therein by the chains E and E'. These chains extend rearward a little more than the whole length of the picking-rollers, and are thrown around the sprocket-wheels G and G', which are situated upon short shafts, which extend upward and support the sprocket-wheels $G^2$ and $G^3$. At the rear the chains pass beneath rails $n$ $n'$, fixed on the inner sides of the boards L L'. These rails extend but a slight distance from the sides of the board, so that the teeth will be projected in an active position beyond them.

$G^4$ is a chain thrown around the sprocket-wheel $G^3$ and behind the sprocket-wheel $G^2$, and extending to the left and around the sprocket-wheel $G^5$. The sprocket-wheel $G^5$ is keyed to a short vertical shaft, having the pinion $G^6$ at its lower end adapted to mesh into the bevel-gear $G^7$ upon the shaft $G^8$, which is clutched to it by the usual clutching mechanism. The shaft $G^8$ is provided with the pinion $G^9$, which is driven by the main gear $G^{10}$ on the axle.

It will thus be seen that by the rotation of the above-described gearing motion is imparted to the gathering-chains E and E', F and F'.

Upon the shaft $G^8$ is a sprocket-wheel $G^{11}$, around which is thrown the chain $C^7$. By means of this sprocket-wheel rotation is given to the picking-rollers. The latter (the rollers) are constructed as shown in Fig. 7, being substantially cylindrical and having plates 1, 2, and 3, which are let into the rollers their depth at the foremost side relative to their movement, but permitted to project some distance at the other edge. The result of this construction is that the plates have a pinching effect upon the stem, and in attempting to draw it through pulls it from the ears. The bearings for the rollers are so slotted that by loosening the bolts which hold them to the main frame they may be adjusted nearer to or farther from each other, as the circumstances may require. The plates $E^2$ and $E^3$ lie immediately below the gathering-chains and extend rearward to a point beyond the front end of the picking-rollers. The said rollers are pointed at their forward extremity, so as to form a space into which the stalks can be forced, and thus be made to enter the rollers, the chain continuing to carry the stalks backward while the rollers are drawing them through. When the ears are made to approach the rollers and snapped off, the chains F and F' convey them rearward, while the stalk is carried downward and rearward. Extending to the left from near the rear end of picking rollers are located the parallel cleaning-rollers H and H', journaled at their ends in suitable bearings secured to parallel beams $A^3$ and $A^4$, extending on either side of the husking rollers at the rear of the machine. In order to prevent the escape of the ears while they are being operated upon by these husking rollers, I provide upright boards O O', extending longitudinally of the said rollers on each side some distance above them, so that a channel is formed thereover. As shown in Fig. 6, these boards are sustained by brackets $o$ $o'$, extending upward from the beams $A^3$ and $A^4$. Extending laterally from the upper edges of the board O' is a board $o^2$, which serves as a support for the chain $G^4$, hereinbefore referred to. Upon these husking-rollers are the gears $H^2$ and $H^3$, and upon the right-hand end of the roller H is the bevel-gear $H^4$. The shaft of the picking-roller C' is extended rearward and provided with the gear $H^5$, and thus the motion imparted to the roller C' is transmitted to the rollers H and H'. These rollers are preferably inclined downward to the left, in order that the ears may move onward by gravity while the husks are being taken off; but to prevent clogging I provide a toothed chain $H^6$, thrown around the sprocket-wheels $H^7$, $H^8$, and $H^9$. I so adapt the front part of the chain that it shall be substantially parallel with the cleaning-rollers and move the ears along in the direction of delivery while they are being operated upon. Motion is imparted to this chain by the shaft I, upon the top of which is the sprocket-wheel $H^7$.

In order that the gathering and conveying chains F F' may deliver the ears to the husking-rollers H H', I provide a plate or board N, (shown in Figs. 1 and 5,) which extends beneath the conveying-chains across the space between them at their delivery end. This plate is secured at its edges to the sides of the boards L L', before referred to, and is so arranged that the ears will be pushed by the chains from the picking-rollers upon the board and moved thereon rearward and pushed onto the husking-rollers. The board N serves, as it will be seen, as a support or guide for the ears while they are being moved from the picking to the husking rollers.

J is a sprocket-wheel on the rear end of the shaft $G^8$, and around it and the wheel J' is thrown the chain $J^2$. The wheel J', being upon the shaft $J^3$, it imparts motion to the bevel-wheel $J^4$, located upon it, and motion is in turn imparted through the bevel-gear $J^5$ to the shaft I. The shaft $J^3$ is supported upon suitable bearings secured to the under side of a transverse bar J*, which is secured to the under side of the elevator-frame. The shaft J³ is provided with a sprocket-wheel K, adapted to receive the elevator-chain K'. K² is the elevator-spout, suitably braced to the harvester, and having at its upper end a sprocket-wheel K³, around which the elevator-chain is also thrown. The said chain is provided with buckets K⁴, of sufficient width and length to cause the ears of grain to move upward along the elevator.

I provide a cover for the cleaning-roller H, consisting of rope or strands of rawhide or other suitable material wound around a core of wood or metal, thus giving it a surface which is at once made to conform to the roller H', and thus engages the husks with such force as to draw them through.

It will be observed that the rope is wound closely on the core with the coils in contact so that the rope entirely covers the same. The surface of the rope-covered core thus presents a series of adjoining ribs or ridges, which peculiarly adapt it for the end in view.

The shafts are suitably mounted in bearings secured to the frame-work, as shown in the drawings.

M and M' are two slight springs secured by bolts to the frame-work immediately above the delivery ends of the cleaning-rollers. They may be made of any thin metal, so as to yield at their lower ends, or they may be hinged and slight springs or gravity be made to hold them down, their object being to prevent the ears from passing out until they are forced to move beyond them. By these devices the ears are held in position to have the husks operated upon as long as possible.

The operation of the machine is as follows: Being drawn forward, the stalks are gathered inward by the chains E and E', are then seized by the chains F and F' and carried rearward and made to enter the rollers, and as the ears are snapped off by the stalks being carried downward the last-named chains convey the ears backward and deliver them onto the cleaning-rollers H and H', along and down which they are carried by the toothed chain H⁶ and delivered into the hopper of the elevator K², from whence they are carried upward into the wagon.

What I claim as my invention, and desire to secure by Letters Patent, is—

1. The combination of the wheeled frame, the picking-rollers, the co-operating chain traveling adjacent to the picking-rollers and arranged to convey the detached ears, and the bars E² and E³, extending longitudinally of the rollers and adjustable laterally independently of the chain, substantially as described.

2. The improved husking-roller consisting of a core provided with rope or equivalent material wound closely thereon, whereby the surface presents a series of adjoining ribs or ridges.

3. The husking mechanism consisting of the combination, with a roller provided with a smooth surface, of a companion roller provided with rope or equivalent material wound closely thereon, substantially as described.

4. The combination, with the husking-rollers, of the yielding fingers arranged adjacent to the delivery end of the said rollers in the path of the ears.

5. The combination, with the husking-rollers and their co-operating conveying-chain, of the yielding fingers arranged adjacent to the delivery end of said rollers in the path of the ears.

6. The combination of the picking-rollers, the co-operating chains adapted to convey the detached ears, and the bars E² and E³, extending longitudinally of the chains, said picking-rollers and the bars being laterally adjustable independently of each other and of the chains, substantially as described.

GEORGE MEADER.

Witnesses:
GEO. WADSWORTH,
D. J. EASTBURN.